(12) United States Patent
Appleby et al.

(10) Patent No.: US 10,178,037 B2
(45) Date of Patent: Jan. 8, 2019

(54) DEADLINE DRIVEN CONTENT DELIVERY

(71) Applicant: BRITISH TELECOMMUNICATIONS PUBLIC LIMITED COMPANY, London (GB)

(72) Inventors: Stephen Clifford Appleby, London (GB); Rory Stewart Turnbull, London (GB); Michael Eilling Nilsson, London (GB); Ian Barry Crabtree, London (GB); Brahim Allan, London (GB); Timothy Sean Stevens, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 239 days.

(21) Appl. No.: 14/779,694

(22) PCT Filed: Mar. 4, 2014

(86) PCT No.: PCT/GB2014/000078
§ 371 (c)(1),
(2) Date: Sep. 24, 2015

(87) PCT Pub. No.: WO2014/155031
PCT Pub. Date: Oct. 2, 2014

(65) Prior Publication Data
US 2016/0057064 A1 Feb. 25, 2016

(30) Foreign Application Priority Data
Mar. 27, 2013 (EP) .................................. 13250037

(51) Int. Cl.
*H04L 12/811* (2013.01)
*H04L 12/825* (2013.01)
(Continued)

(52) U.S. Cl.
CPC .......... *H04L 47/25* (2013.01); *H04L 43/0835* (2013.01); *H04L 47/127* (2013.01); *H04L 47/28* (2013.01)

(58) Field of Classification Search
None
See application file for complete search history.

(56) References Cited

U.S. PATENT DOCUMENTS
2010/0316066 A1 12/2010 Leung

FOREIGN PATENT DOCUMENTS
EP 2 262 148 12/2010
WO WO 2009/049676 4/2009

OTHER PUBLICATIONS
International Search Report for PCT/GB2014/000078, dated Jul. 10, 2014, 2 pages.

*Primary Examiner* — Scott B Christensen
(74) *Attorney, Agent, or Firm* — Nixon & Vanderhye P.C.

(57) ABSTRACT

Examples of the present invention present a method of controlling content delivery in a network. A global quality of experience measure, $QoE_{max}$, is calculated based on the packet loss rate in the network. As packet loss rate varies as a result of congestion conditions in the network, so will $QoE_{max}$. A server delivering content over the network will attempt to reach $QoE_{max}$ for the content in its respective session. Those sessions with a quality of experience, QoE, less than $QoE_{max}$ will have its packet dispatch rate increased, and those with a QoE higher than $QoE_{max}$ will reduce its packet dispatch rate, subject to any delivery deadlines associated with the session. If the delivery deadlines of the sessions can be met without exceeding $QoE_{max}$, then all sessions will end up achieving $QoE_{max}$. Since $QoE_{max}$ is only a function of packet loss rate that all sessions miming (Continued)

over the same shared network agree upon, all sessions should converge on the same QoE.

8 Claims, 4 Drawing Sheets

(51) Int. Cl.
    *H04L 12/26*     (2006.01)
    *H04L 12/801*     (2013.01)
    *H04L 12/841*     (2013.01)

DEADLINE DRIVEN CONTENT DELIVERY

This application is the U.S. national phase of International Application No. PCT/GB2014/000078 filed 4 Mar. 2014, which designated the U.S. and claims priority to EP Patent Application No. 13250037.2 filed 27 Mar. 2013, the entire contents of each of which are hereby incorporated by reference.

FIELD OF THE INVENTION

This invention relates to a method and apparatus for controlling the delivery of content over a shared network.

BACKGROUND TO THE INVENTION

A few years ago, different service types used different network protocols and often different proprietary software to delivery content, such as video, over a network. As content delivery and associated services have exploded on the Internet, Content Delivery Networks (CDNs) have had to scale accordingly. To make this expansion economical, there has been a tendency to reduce the number of protocols and server types in use to the point where virtually every non-real time application and even some real-time applications use HTTP.

The challenge with this rationalisation is that the generic nature of HTTP, in conjunction with the underlying TCP protocol, means that there is no way to share network resources in a way that is sensitive to the application requirements. For example, video streaming is likely to require very different bandwidth requirements to a file download.

Over-demand of bandwidth is dealt with very differently depending on the network. On a typical fixed broadband network, a packet scheduling algorithm called 'Fair Queuing' results in each access line getting an equal share of the available bandwidth when there is congestion. However, there is no network-based sharing mechanism for the traffic competing on a single access line. In this latter case, the dynamics of the transport protocol and the service will determine the share of access line capacity that each session gets, without any consideration of the requirements of each session.

In the past, with relatively slow access speeds, there has been a need to manage multiple services on a single access line, as users would run a small number of applications at a time and they would be aware of the limitations of the access network. In this situation, the principle of TCP friendliness where packet send rates are adjusted in response to congestion in the same manner for all sessions, copes as a resource sharing mechanism, albeit somewhat inefficiently.

However, as higher bitrate access technology is rolled out, customers will expect to be able to consume many services simultaneously. With no explicit way of controlling the share of network capacity amongst different streams or applications, the overall customer experience might fall short of customer expectations. The radically different bandwidth demands of different services mean that the principle of TCP friendliness is unlikely to result in a good customer experience.

To share bandwidth in a way that is dependent on the individual service, network operators can introduce network Quality of Service (QoS), which gives priority to packets that are marked appropriately. This allows prioritisation over the backhaul network and on the individual access line.

However, in practice network QoS is rarely used. It is complex to integrate with services, as they need to be authenticated by the network to ensure that are allowed to prioritise their traffic. More complex systems may require sessions to be set up to reserve capacity. Accounting and billing is also more complex. Each network operator will deploy their own QoS system, and so a national or international service provider will have to go to great expense to integrate many different operators' QoS systems and have an independent commercial relationship with each. For these reasons, QoS is rarely used for services other than those provided by the network operator itself. Even then, it is questionable as to whether it is cost-effective.

SUMMARY OF THE INVENTION

It is the aim of embodiments of the present invention to provide an improved method of controlling content delivery over a shared network.

According to one aspect of the present invention, there is provided a method of managing content delivery between a server and a client over a network, wherein the content comprises a plurality of segments, and each segment having an associated delivery deadline, said method comprising:

determining a minimum packet dispatch rate for the packets of each segment, based on the delivery deadline associated with each segment;

transmitting the packets of a segment over the network at a packet dispatch rate at least equal to the minimum packet dispatch rate, and determining the resulting packet loss rate in the network;

determining a network quality of experience parameter based on the determined packet loss rate in the network;

determining a predicted quality of experience of the next segment to be transmitted;

comparing the predicted quality of experience with the network quality of experience; and adjusting the packet transmission rate for the next segment in dependence on the result of the comparing step, whilst maintaining the packet dispatch rate at the minimum packet dispatch rate or higher.

If the predicted quality of experience is less than the network quality of experience, then the packet dispatch rate may be increased for the next segment. Conversely, if the predicted quality of experience is higher than the network quality of experience, then the packet dispatch rate may be decreased for the next segment.

The delivery deadlines for the segments are typically provided by the client to the server together with a request for the content from the server.

According to a second aspect of the invention, there is provided a server for delivering content to client over a network, wherein the content comprises a plurality of segments, and each segment having an associated delivery deadline, said server adapted to:

determine a minimum packet dispatch rate for the packets of each segment, based on the delivery deadline associated with each segment;

transmit the packets of a segment over the network at a packet dispatch rate at least equal to the minimum packet dispatch rate, and determining the resulting packet loss rate in the network;

determine a network quality of experience parameter based on the determined packet loss rate in the network;

determine a predicted quality of experience of the next segment to be transmitted;

compare the predicted quality of experience with the network quality of experience; and adjust the packet transmission rate for the next segment in dependence on the result of the comparing step, whilst maintaining the packet dispatch rate at the minimum packet dispatch rate or higher.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular, examples. The invention is not, however, limited to such examples.

Examples of the present invention present a method of controlling content delivery in a network. A global quality of experience measure, $QoE_{max}$, is calculated based on the packet loss rate in the network. As packet loss rate varies as a result of congestion conditions in the network, so will $QoE_{max}$. A server delivering content over the network will attempt to reach $QoE_{max}$ for the content in its respective session. Those sessions with a quality of experience, QoE, less than $QoE_{max}$ will try and increase its packet dispatch rate, and those with a QoE higher than $QoE_{max}$ will reduce its packet dispatch rate, subject to any delivery deadlines associated with the session. If the delivery deadlines of the sessions can be met without exceeding $QoE_{max}$, then all sessions will converge on $QoE_{max}$. Since $QoE_{max}$ is only a function of packet loss rate that all sessions running over the same shared network agree upon, all sessions should converge on the same $QoE_{max}$.

The majority of traffic sent over the internet is driven by HTTP requests. HTTP will continue to grow as the protocol of choice for media delivery over the internet, as HTTP Adaptive Streaming standards replace proprietary protocols, such as RTMP, used by Adobe. Flash.

The use of HTTP implies the use of TCP as the transport protocol. The rate at which TCP allows data to be sent is determined primarily by two factors:

(i) the rate at which the receiver can accept data; and
(ii) the packet loss rate and round trip time Thus, the rate at which a server sends data is given by the lesser of the rates determined by these two constraints. From the perspective of a session, where a session might be a file download or the streaming of a video sequence, we could impose a maximum delivery rate by controlling the rate at which the receiver consumes data. However, we can't increase the delivery rate beyond the limit imposed by the packet loss rate in the network. The fact that the packet loss rate in the network sets an upper bound for the send rate is a principle of TCP-friendliness, which is critical in avoiding congestion collapse.

However, setting a global speed limit for TCP based purely on packet loss rate means that two TCP sessions which suffer the same packet loss rate and have similar round trip times will have the same speed limit imposed. However, the relationship between Quality of Experience (QoE) and bitrate will be very different for different types of session. If a Constant Bit Rate (CBR) video streaming session is delivered at slightly less than the rate of the media, then the resulting QoE will be very poor. However, if the rate at which a file download session is reduced by a small amount, then resulting QoE will hardly change.

Examples of the present invention propose introducing a modification to the way that the transport protocol behaves, so that instead of packet loss rate imposing a cap on the delivery rate as in standard TCP, the packet loss rate is instead used to determine a nominal maximum QoE for the network. This maximum QoE is then used by all servers to control content delivery in a session, so that content is delivered with a QoE that does not exceed this maximum QoE. We refer to this maximum QoE as $QoE_{max}$. Furthermore, in examples of the invention, the delivery rate of the content takes into consideration the delivery deadline associated with the content. Both these concepts of QoE and delivery deadlines will be explored in more detail below.

Proposed is a global function, fixed for all services, which sets $QoE_{max}$ in dependence on the packet loss rate experienced in the network. This function ultimately determines the bandwidth share amongst multiple services sharing the same network, and together with delivery deadline considerations, provides an alternative congestion response mechanism to standard TCP.

This function is generated through testing, with the aim of defining $QoE_{max}$ as a function of packet loss rate. To determine the function, a reference service is chosen, then we try to set the $QoE_{max}$ function in a manner that delivers the service at the same bitrate as a normal TCP session. We begin by forming a simplified relationship between packet loss rate and throughput for a notional generic TCP. We then select a service to use as our quality reference.

We know that for TCP, the throughput varies approximately as the reciprocal of the square root of the packet loss rate and that it depends also on round trip time. Thus, we define a reference relationship between bitrate and packet loss rate as the same as this idealised relationship—that is, it follows the reciprocal of the square root of packet loss rate. The normal throughput equation for TCP (in congestion avoidance mode) is given by inequality (1) below:

$$\text{bitrate} \leq \frac{MSS}{RTT \cdot \sqrt[2]{\text{Packet Loss Rate}}} \quad (1)$$

Where MSS is the maximum segment size and RTT is the round trip time. The packet loss rate is a measure of the fraction of the data that is lost e.g. 10% of packets. One proposed technique to measure packet loss rate is to use a Weighted Moving Average approach, in particular an Exponentially Weighted Moving Average, in which the significance of later measurements decays exponentially with their age. This is described in more detail in the paper "Equation-Based Congestion Control for Unicast Applications", by Sally Floyd et al, August 2000, SIGCOMM 2000. To make this relationship independent of round trip time, we can fix the round trip time to a plausible constant value, and also fix the maximum segment size, so for example, set MSS=1500 bytes and RTT=20 ms. This gives the reference bitrate inequality (2):

$$\text{bitrate} \leq \frac{600\,000}{\sqrt[2]{\text{Packet Loss Rate}}} \quad (2)$$

To use this inequality to derive our global $\text{QoE}_{max}$ function, we consider delivering a reference session using this reference bitrate inequality.

It is convenient to use a video streaming session as the reference, as this provides a clearly defined relationship between bitrate and QoE of the content. One approach is to take a particular test video segment, encoded and displayed in standard definition. By selecting this service as the reference, we are saying that, if we use the delivery mechanism proposed to share bandwidth to deliver this reference service, we will obtain approximately the same bandwidth share as TCP would have done.

If we subsequently use our method to deliver a more challenging service, such as high definition video, then our method needs to be more aggressive than normal TCP in order to gain sufficient bandwidth to deliver the more complex video, but at the same nominal QoE. Conversely, less challenging services than the reference service should use less bandwidth share than normal TCP.

Having selected our reference session, the QoE is determined as a function of bitrate for this reference. This can be done by subjective testing. Thus, from testing we get equation (3):

$$\text{QoE} = f(\text{bitrate}) \quad (3)$$

Finally, to create the global $\text{QoE}_{max}$ function, we use our reference TCP inequality (2) to calculate bitrate as a function of packet loss, then map this bitrate onto a QoE value using the reference session from equation (3). The result is a function for $\text{QoE}_{max}$ that is mapped to packet loss rate as given by equation (4) below:

$$\text{QoE}_{max} = f(\text{Packet Loss Rate}) \quad (4)$$

With the function properly defined, equation (4) gives a value for the global measure for QoE, $\text{QoE}_{max}$, for a given packet loss rate.

As discussed above, we also want to take into consideration any delivery deadlines associated with the content we are trying to deliver in order to optimise our delivery mechanism.

Timeliness of content delivery can be extremely important depending on the session type. Streamed media is the most obvious; where each segment of the media must be received before the client buffer empties, and media playout stalls. The playout rate and buffer fullness thus affects the delivery deadline for each segment of the media. Other examples might include pre-loading media off-peak for playback according to a schedule. In such a session, the media should complete downloading prior to playout.

In both these examples, adherence to a deadline is essential and should take priority over any QoE considerations.

The principles set out above will now be described in an exemplary method and apparatus below. The method below takes into account QoE as well as delivery deadlines, both of which are important considerations as discussed when delivering content.

Figure 1:
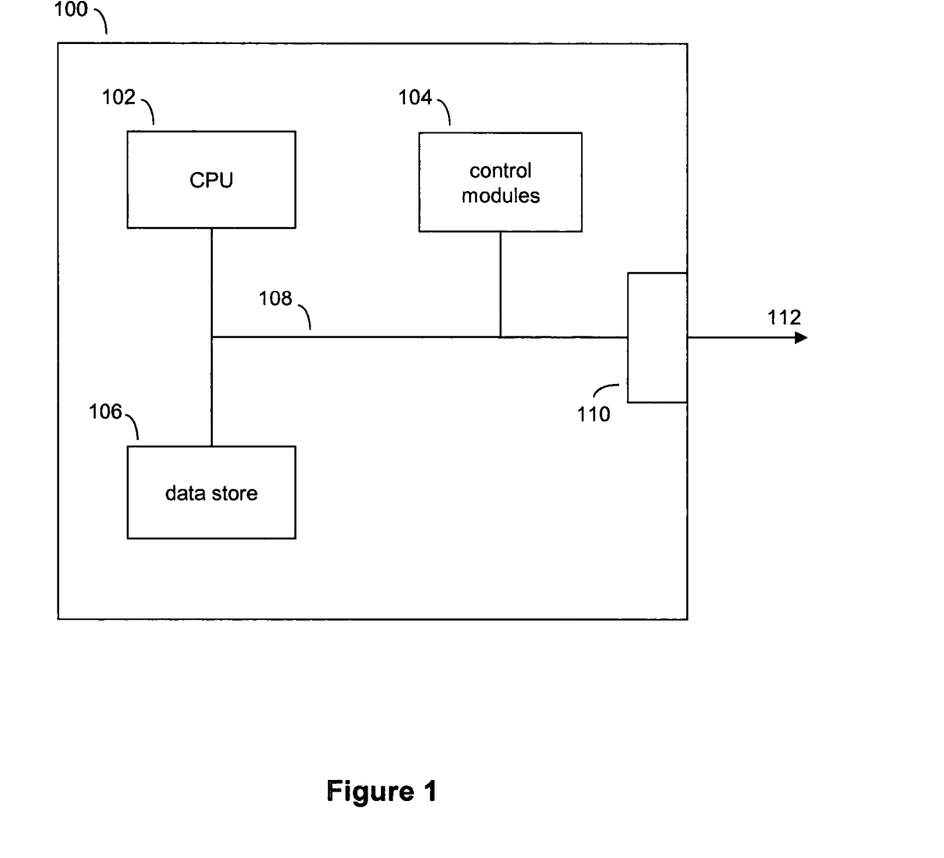
FIG. 1 is a block diagram showing a content server.

FIG. 1 shows a content server 100 in an example of the invention, comprising a CPU 102 operating under the control of the program modules 104, which may be stored in suitable storage such as a hard disk. A data store 106 is also provided, which can store other data, such as video or any other content served by the content server 100. The CPU 102, program modules 104, and data store 106 are interconnected by way of a suitable bus 108. The content server 100 also comprises a network interface card 110, over which data can be transmitted and received by the content server 100.

Figure 2:
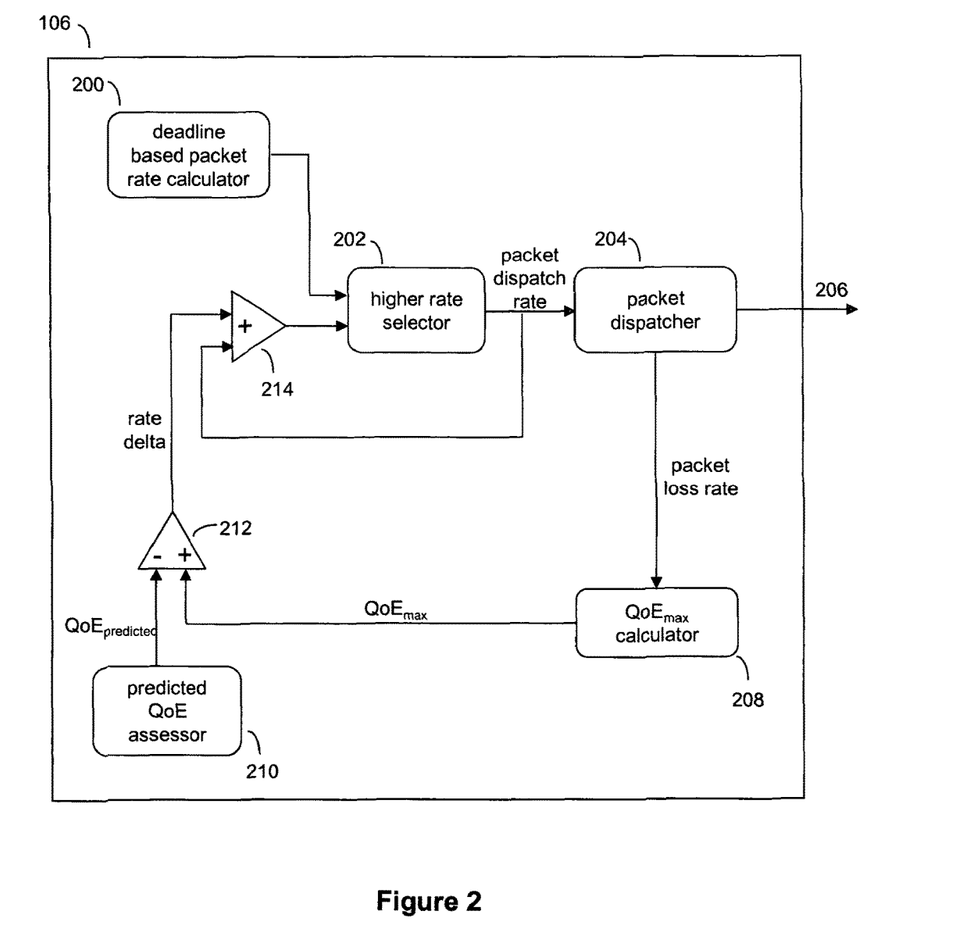
FIG. 2 is a block diagram showing the functional modules and information flow in an example of the invention.

FIG. 2 shows the program modules 104 in more detail. The program modules 104 include a deadline based packet rate calculator 200, a higher rate selector 202, a packet dispatcher 204, a $\text{QoE}_{max}$ calculator 208, and a predicted QoE assessor 210. The deadline based packet rate calculator 200 calculates minimum packet dispatch rates for content, or segment of content, based on an associated delivery deadline. The higher rate selector 202 selects the higher of any packet dispatch rates provided. The resulting packet dispatch rate is passed by the higher rate selector 202 to the packet dispatcher 204, which controls dispatch of packets of the content into the network, at the provided packet dispatch rate. The packet dispatcher 204 also measures the packet loss rate experienced in the network, and passes the resulting packet loss rate to the $\text{QoE}_{max}$ calculator 208, which uses the function set out in equation (4) to calculate $\text{QoE}_{max}$ based on the packet loss rate. The predicted QoE assessor 210 determines the QoE of the present or next segment of content to be transmitted, $\text{QoE}_{predicted}$, and passes this to a differentiator 212, which takes the difference between the input $\text{QoE}_{predicted}$ and $\text{QoE}_{max}$ from the $\text{QoE}_{max}$ calculator 208, and outputs a rate that is dependent on both $\text{QoE}_{predicted}$ and $\text{QoE}_{max}$ to a summer 214. The summer 214, takes the rate and uses it to adjust the packet dispatch rate output by the higher rate selector 202. The summer 214 outputs this summed rate to the higher rate selector 202, which selects the higher of this rate and the rate from deadline based packet rate calculator 200, and outputs it to the packet dispatcher 204 for use on subsequent packets, and so on.

Figure 3:
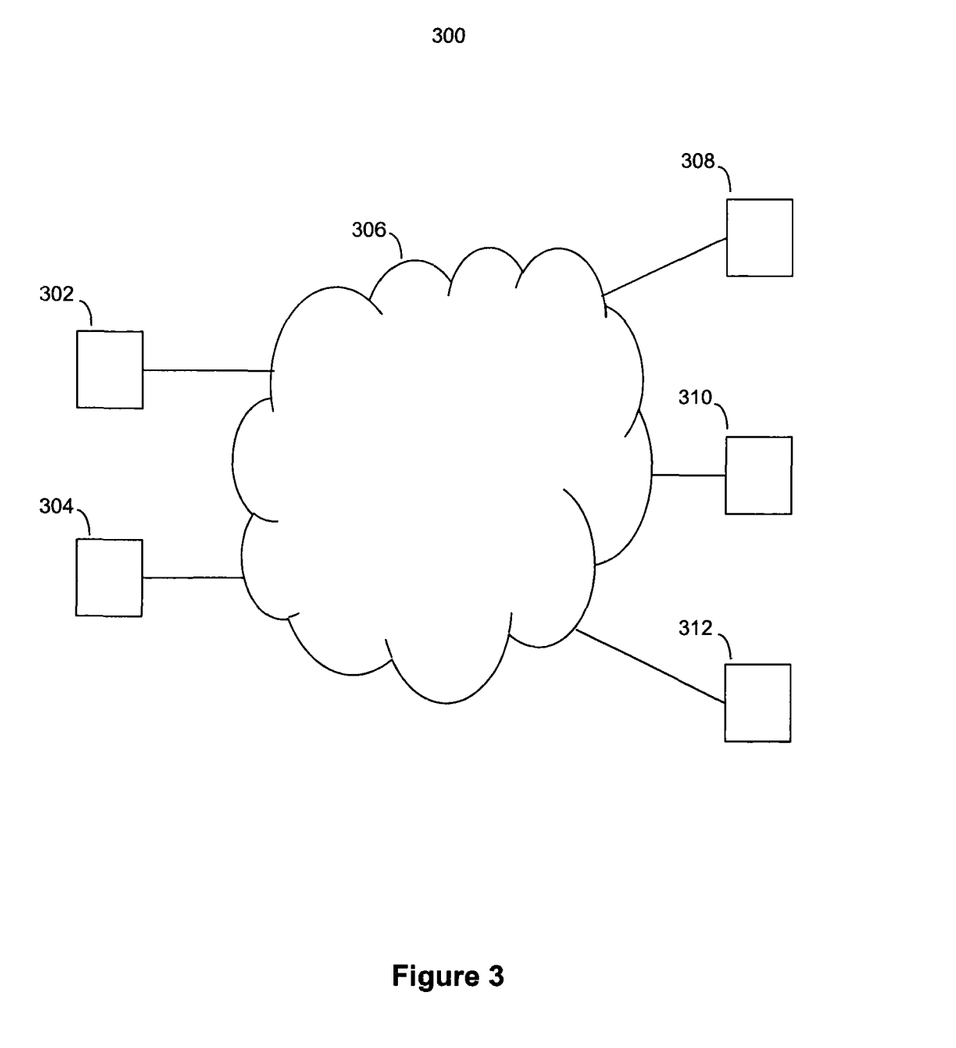
FIG. 3 is diagram showing content servers connected to clients over a network.

FIG. 3 shows a network arrangement 300, comprising content servers 302 and 304. In this example, content server 302 is a video streaming server, connected to a network 306, and capable of streaming video content to any connected client devices. Content server 304 is a download file server, connected to the network 306, and provides file downloads, including video content, to any connected devices. Also shown are three client devices 308, 310 and 312. The client devices can connect to the content servers 302 and 304 over the network 306. The client devices may be a suitably configured PC, set top box, smart TV, tablet or other such device, adapted to request content from the servers 302 and 304.

The servers 302 and 304 are arranged as per the server 100 illustrated in FIG. 1.

The invention will now be described by way of example with reference to the flow chart of FIG. 4, and further with reference to the program modules in FIG. 2.

Figure 4:
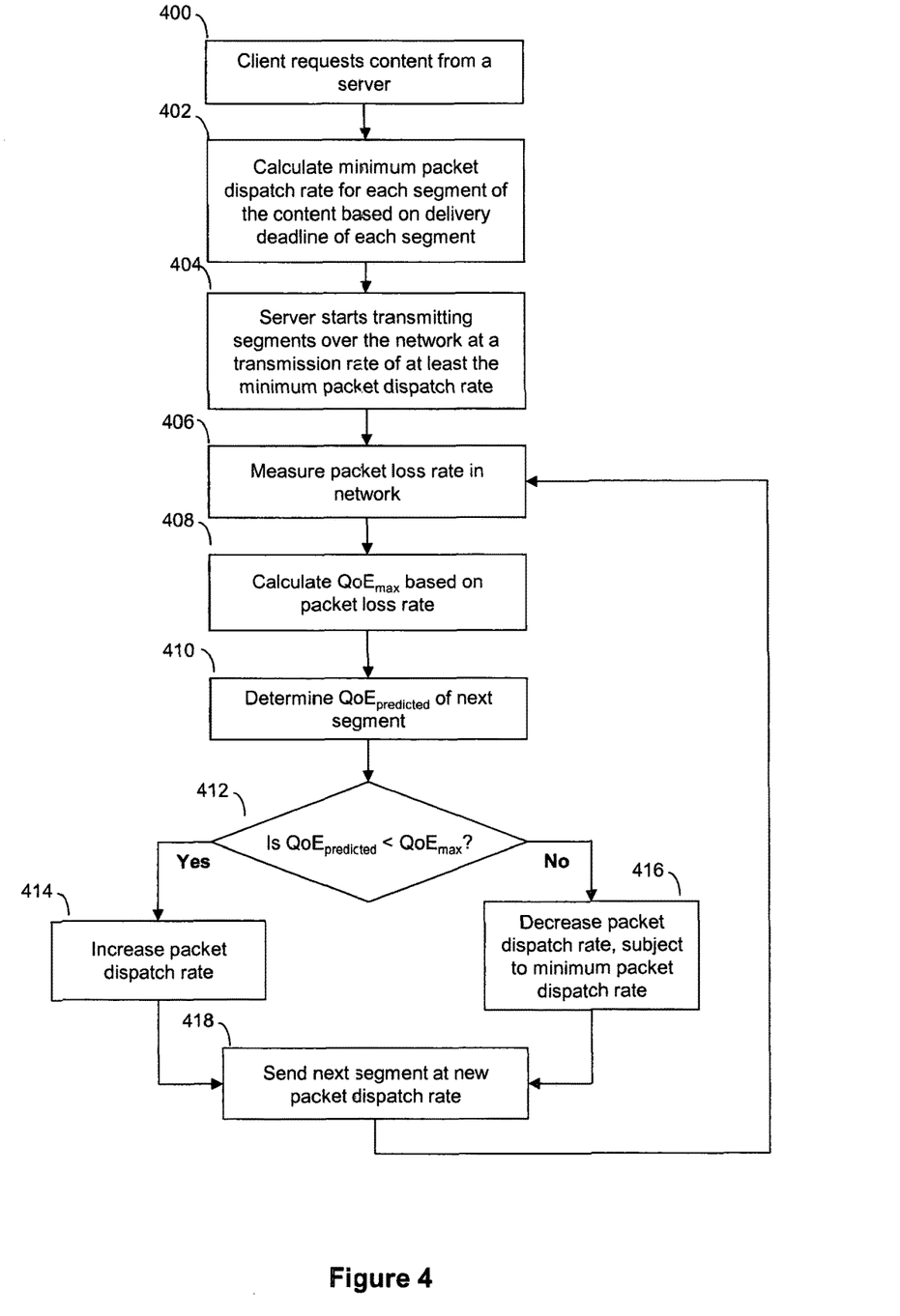
FIG. 4 is a flow chart summarising the steps of an example of the invention.

In step 400 of FIG. 4, client 308 makes a request for content from server 306. Here, the content is a file download. Other examples, including video streaming, will be discussed later. The request for the content from the client 308 includes an associated delivery deadline for the content. Here, we assume that the file download has to be completed by a certain time in the future. The server 306 thus receives the content request, together with the associated delivery deadline.

The method processes content by segments, where a segment is made up of a number of data packets. In this download example, the file requested is made up of a plurality of segments. In step 402, the deadline based packet rate calculator 200 in the server 306 calculates a minimum packet dispatch rate for each segment. One approach to calculate the minimum packet dispatch rate is to examine the file size of the content requested, and divide by the time available before the delivery deadline. More complex approaches to determining the minimum dispatch rate can also be used where anticipated levels of congestion are taken into consideration. Further, the delivery deadline could be adjusted to allow for additional data to be buffered at the client to take to allow for expected variability in throughput or delay in the network.

In step 404, the server starts transmitting the packets of the first segment over the network to the client. The packets are transmitted by the packet dispatcher 204 with a packet dispatch rate at least equal to or greater than the minimum packet dispatch rate.

In step 406, the server measures the packet loss rate of the network. The packet loss rate is used in step 408 by the $QoE_{max}$ calculator to determine $QoE_{max}$. $QoE_{max}$ can be determined using the function described earlier by equation (4), which maps packet loss rate onto $QoE_{max}$.

In step 410, the QoE of the next segment, which we call $QoE_{predicted}$, is determined by the predicted QoE assessor 210. In this case of a file download, $QoE_{predicted}$ will be some finite value dependent on how long the file download is taking so far, and $QoE_{predicted}$ increases with reducing delivery time, as we assume that faster downloads have a higher QoE. In step 412, if $QoE_{predicted}$ is less than $QoE_{max}$, then processing passes to step 414. If $QoE_{predicted}$ is not less than $QoE_{max}$, then processing passes to step 416.

Taking step 414 first, where $QoE_{predicted}$ is less than $QoE_{max}$, the server increases the packet dispatch rate of the next segment to be transmitted. In step 416, where $QoE_{predicted}$ is not less than $QoE_{max}$, the packet dispatch rate is decreased, but ensuring that the rate is not less than the minimum packet dispatch rate. So if the minimum packet dispatch rate has been reached, then the packet dispatch rate should not be decreased further.

The packets of the next segment are transmitted in step 418 with the new packet dispatch rate from either step 414 or 416.

The new packet dispatch rate can be expressed as:

$$\text{dispatch rate} \rightarrow \text{dispatch rate} + f(QoE_{max} - QoE_{predicted})$$

where f( ) is a monotonic function.

Once the next segment has been transmitted, processing can return to step 406, where the packet loss rate is measured, and the packet dispatch rate for the next segment can be adjusted accordingly until all segments are processed.

If the packet dispatch rate reaches, then exceeds the available bandwidth, the packet loss rate will begin to increase. This will reduce $QoE_{max}$ to the point where it equals the $QoE_{predicted}$. This will be the stable delivery point, and the packet dispatch rate will no longer change. This is not shown explicitly in FIG. 4, but when the $QoE_{predicted}$ is equal to $QoE_{max}$, or at least when they are within some tolerance of each other, then the packet dispatch rate is not adjusted. This is the natural stable position reached when this approach is taken.

In practice, the actual time it takes to deliver a segment is not certain. Packets can be dispatched at a given rate, but we cannot guarantee that they are received at this rate due to packet loss. Conversely, earlier segments may be delivered with a packet dispatch rate higher than the minimum packet dispatch rate, and thus later segments can have their delivery deadline recalculated to take these variations into account. Consequently, the minimum packet dispatch rate is revised accordingly for subsequent packets. In video streaming scenarios, where segments are requested one by one by the client, delivery deadlines can be requested by the client that take into account content already been received by the client.

Now let us examine an example with 2 concurrent file downloads. First, assume that the single download has reached the stable state, where $QoE_{predicted}$ equals $QoE_{max}$. When the second download starts, the packet loss rate will increase, which will decrease the $QoE_{max}$ allowed. This will in turn cause the packet dispatch rate of the first download to reduce. This will allow more of the packets from the second stream to reach the corresponding client, and gradually a new stable delivery point will be reached where both sessions have a $QoE_{predicted}$ equal to $QoE_{max}$, the maximum imposed by the packet loss rate.

The proposed method replaces the standard TCP congestion response mechanism. Instead, congestion in the network, specifically the packet loss rate experienced, is dealt with using the above described method.

We will now consider a number of cases where delivery deadlines are essential.

First, a constant bit rate streaming session.

A video file encoded at constant bitrate (CBR) is critically sensitive to the delivery bitrate. If the delivery rate is below the media rate, then the QoE is usually completely unacceptable, as the sound will be interrupted and the video will stall. If the file is delivered at above this rate, then there is no increase in QoE.

If we assume an HTTP streaming scenario, then the client will request segments in sequence. In our proposal, each request would include a delivery deadline which would take into account any buffered video already accumulated in the client.

If the network bandwidth is high enough to support the encoding rate of the media and there are no other sessions, then the packet dispatch rate will increase until it exceeds the network capacity, when the packet loss rate will begin to rise. This will cause $QoE_{max}$ to drop accordingly to the point where it equals the actual QoE, or $QoE_{predicted}$, of the video stream and the system will have reached a stable point.

If we now start downloading a file concurrently with the CBR video stream, the packet dispatch rate will decrease to ensure that the packet loss rate remains at that consistent with the $QoE_{predicted}$ of the segments of the video stream. This will in turn mean that the throughput reduces.

If we have been delivering at a packet dispatch rate that is faster than the encoding rate of the video for some time, the client will have built up a certain amount of buffer. This means that the delivery deadlines will adjust to allow more time for delivery for subsequent segments.

If the situation is modified by adding further sessions over the shared network, such that the resulting packet loss rate means that $QoE_{max}$ is less than $QoE_{predicted}$ of the CBR stream. This would mean that, based on $QoE_{max}$ alone, we would not be able to deliver packets at a sufficient rate to stream the video properly.

However, since the delivery deadline takes priority over QoE considerations, the server will endeavour to dispatch packets at such a rate that the delivery deadline is met, even though this would make $QoE_{predicted}$ of segments in the CBR stream larger than $QoE_{max}$.

As it stands, this will on some occasions lead to instability. If we have insufficient capacity on our network connection for our CBR video stream, then the dispatch rate would increase boundlessly to try to get the throughput sufficiently high to deliver the video.

Turning now to a variable bit rate, or adaptive video streaming session example.

In adaptive streaming systems, a video sequence is encoded at a number of different bit rates, and the system adaptively switches between the different rates in response to network conditions. Under normal TCP, the packet loss rate determines the TCP throughput, and the system selects the highest bitrate segment whose bitrate is less than or equal to the TCP throughput.

To see how adaptive streaming would work with the approach proposed here, let us start by considering the simplest case where we have multiple bitrate presentations of each segment, and the content is such that we can associate a single QoE value with each bitrate i.e. the QoE does not vary within a given bitrate representation.

As streaming takes place, the server will monitor the packet loss rate to determine the maximum $QoE_{max}$. If possible, the server will select segments encoded at a bitrate such that $QoE_{max}$ is not exceeded. The exception is when the (lowest) QoE of the segment encoded with the lowest bitrate is already higher than $QoE_{max}$, in which case the lowest QoE presentation is selected. The server will schedule delivery of the segment to ensure that the delivery deadline is met.

If the $QoE_{max}$ exceeds the highest QoE that can be achieved with the encoded segments available, then the packet dispatch rate will increase with a corresponding increase in packet loss rate until $QoE_{max}$ reduces to the highest QoE available, just as in the CBR case. This will allow the client to build up a buffer. If subsequently the packet loss rate increases (for example, due to other traffic in the network), then $QoE_{max}$ will be reduced further. The server will select a lower bitrate segment, however the buffer that has been built up means that the server will be given a longer deadline for delivering this segment.

If we imagine now that we two video sequences of different genres sharing the same connection, such that the QoE that is achieved for a given bitrate is quite different for the two genres. Since both sessions will see the same packet loss rate, they will calculate the same $QoE_{max}$. With no other constraints, they will deliver streams of similar QoE, even though this might require different session bitrates.

This will not be the case if say, the lowest QoE available for one stream is above $QoE_{max}$ calculated from the packet loss rate. In this case, the lowest quality stream will be delivered at a rate which meets the delivery deadlines. This will force the other stream to drop back to a lower QoE.

The situation becomes more complex when QoE changes within a single bitrate representation. Suppose we have an easy scene followed by a difficult one. We deliver the easy scene at a QoE which corresponds to the current packet loss rate. However, to deliver the more difficult scene at the same QoE we might need to increase the throughput considerably. Increasing the bitrate will most likely result in an increase in packet loss rate, which would imply that we should deliver at a lower QoE.

We can see that the dynamics can become quite complex.

In order for the dynamics to be stable, we do not want the packet loss rate to vary rapidly. This implies that we also do not want the packet dispatch rate to vary rapidly either. One approach we can take is to damp the packet loss rate measurements, which can be done using the Weighted Moving Average approach referred to above. Further, we can avoid rapidly fluctuating packet dispatch rate by limiting the rate of change of the packet dispatch rate in response to $QoE_{predicted}$ and $QoE_{max}$.

Various methods can be used to determine the instantaneous QoE, $QoE_{predicted}$, for streamed video. Examples include some evaluation of video quality using mean square error (MSE) and peak signal to noise ratio (PSNR), both of which rely on access to the original video as reference. Alternatively, a perceptual quality measure such as PMOS (predicted mean opinion score), could be used instead, as taught in International patent application WO2007/066066, which takes into account masking effects based on contrast in the picture and does not require a reference video for comparison.

Exemplary embodiments of the invention are realised, at least in part, by executable computer program code which may be embodied in an application program data. When such computer program code is loaded into the memory of the processor 102 in the content server 100, it provides a computer program code structure which is capable of performing at least part of the methods in accordance with the above described exemplary embodiments of the invention.

A person skilled in the art will appreciate that the computer program structure referred to can correspond to the flow chart shown in FIG. 4, where each step of the flow chart can correspond to at least one line of computer program code and that such, in combination with the processor 102 in the content server 100, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery between a server and a client over a network, wherein the content comprises a plurality of segments, and each segment having an associated delivery deadline, said method comprising:
    (i) determining a minimum packet dispatch rate for the packets of each segment, based on the delivery deadline associated with each segment, the delivery deadline associated with each segment identifying a specified time by which the packets of that associated segment are to be delivered to the client;
    (ii) transmitting the packets of a segment over the network at a packet dispatch rate at least equal to the minimum packet dispatch rate, and determining the resulting total packet loss rate in the network;
    (iii) determining a global network quality of experience parameter based on the determined total packet loss rate in the network over a plurality of sessions;
    (iv) determining a predicted quality of experience of a next segment of the plurality of segments to be transmitted;
    (v) comparing the predicted quality of experience with the global network quality of experience; and
    (vi) adjusting the packet dispatch rate for the next segment in dependence on the result of the comparing step, whilst maintaining the packet dispatch rate at the minimum packet dispatch rate or higher.

2. A method according to claim 1, wherein if the predicted quality of experience is less than the network quality of experience, then increasing the packet dispatch rate for the next segment.

3. A method according to claim 1, wherein if the predicted quality of experience is higher than the network quality of experience, then decreasing the packet dispatch rate for the next segment.

4. A method according to claim 1, wherein the delivery deadlines associated with each segment are provided by the client to the server.

5. A server for delivering content to client over a network, wherein the content comprises a plurality of segments, and each segment having an associated delivery deadline, said server comprising a processor and storage memory storing instructions which upon execution by the processor enable the server to at least be adapted to:
  determine a minimum packet dispatch rate for the packets of each segment, based on the delivery deadline associated with each segment, the delivery deadline associated with each segment identifying a specified time by which the packets of that associated segment are to be delivered to the client;
  transmit the packets of a segment over the network at a packet dispatch rate at least equal to the minimum packet dispatch rate, and determining the resulting total packet loss rate in the network;
  determine a global network quality of experience parameter based on the determined total packet loss rate in the network over a plurality of sessions;
  determine a predicted quality of experience of a next segment of the plurality of segments to be transmitted;
  compare the predicted quality of experience with the global network quality of experience; and
  adjust the packet dispatch rate for the next segment in dependence on the result of the comparing step, whilst maintaining the packet dispatch rate at the minimum packet dispatch rate or higher.

6. The server according to claim 5, wherein if the predicted quality of experience is less than the network quality of experience, then the packet dispatch rate is increased by the server for the next segment.

7. The server according to claim 5, wherein if the predicted quality of experience is higher than the network quality of experience, then the packet dispatch rate is deceased by the server for the next segment.

8. The server according to claim 5, wherein the delivery deadlines associated with each segment are provided by the client to the server.

* * * * *